Patented Dec. 12, 1933

1,938,734

UNITED STATES PATENT OFFICE 1,938,734

FILTER

Robert B. Withrow, Cincinnati, Ohio, assignor to General Development Laboratories, Inc., New York, N. Y., a corporation of Delaware No Drawing. Application February 5, 1931
Serial No. 513,779

15 Claims. (Cl. 95—81.5)

This invention relates to means for filtering light and more particularly to light filters which do not transmit appreciably below definite wave lengths in the ultra-violet region.

For many purposes it is desirable to filter the light from ultra-violet sources so as to exclude therefrom undesirable short wave lengths. Certain liquid solutions can be employed for this purpose with good results, but for many purposes liquid filters are undesirable because of the difficulty in transporting and handling the liquid, prevention of leakage, the use of circulating means for the liquid, etc. Moreover, liquid filters usually consist of containers of quartz glass which are expensive and fragile. Certain types of glass are also known which have a filtering action, but these glasses are also expensive and fragile and do not meet the need for an inexpensive dry filter which may be easily kept and does not break.

One of the objects of the invention is to provide a novel inexpensive dry filter.

Another object is to provide a filter in the form of a pliable sheet.

A further object is to provide a filter in the form of suitable filtering material carried by a sheet of inexpensive base material which is preferably pliable and has a fair degree of mechanical strength.

A still further object is to provide a dry filter which may be kept in quantities, as in packs or rolls, to be used as needed.

Accordingly the invention consists in a dry filter which comprises a sheet or film of suitable base material transparent at least to the desired wave lengths to be used, which sheet or film carries a suitable filtering material which does not transmit wave lengths shorter than the desired critical wave lengths.

The sheet or film material which is employed as a base for the filter may be of various kinds. For example, any cellulose or gelatinous substance having a high degree of transmission of the wave lengths which it is desired to employ can be used as a base. Preferably this base material is pliable. The substances which may be employed for filtering purposes are many in number and of wide variety, including both organic and inorganic chemical compounds. As a rule, these substances each have a distinct absorption point which may vary for different substances, so that for different purposes a filtering material must be selected which has the desired cut-off point.

The thickness of the filter is not critical, but in general the thicker the filtering material, the sharper and more definite the cut-off obtained. Where the energy at wave lengths which are to be filtered out is more intense, the filter should preferably be correspondingly thicker. Filters may accordingly be constructed of different thicknesses depending upon the purpose for which they are to be employed, or several sheets of a thin filter may be used together.

For purposes of illustration, examples are given hereafter of filters designed to cut off at various points in the ultra-violet region. As base materials for such filters, treated cellulosic materials such as cellophane or regenerated cellulose, gelatin sheets, and the like can be employed as these substances are transparent in the useful range of the ultra-violet, of good mechanical strength, and are inexpensive. Moreover, these base materials are flexible.

The filters are preferably prepared by soaking sheets of the base material in solutions of the desired filtering material. If flexible filters are desired, slight quantities of a material such as glycerin can be added to keep the base material pliable, these added materials being transparent and preferably non-volatile, or a suitable deliquescent salt may be employed.

In the following examples of filters embodying the invention, the particular sizes and amounts of the materials are selected to give good cut-off points when used in a single thickness with a light source comprising a quartz mercury arc and Corex D glass. With other light sources, it may be desirable to use thicker filters or to use two or more of the filter sheets together if a sharp cut-off is desired.

*Example 1.*—A sheet of No. 600 cellophane (regenerated cellulose .002 inches thick) is soaked in a solution consisting of 1,000 grams of water and 80 grams of sodium or potassium benzoate, about 125 cc. of glycerin being added if a pliable filter is desired. A single thickness of this filter, particularly when used under the conditions specified above, does not transmit appreciably below 2890 angstrom units.

*Example 2.*—A sheet of No. 600 cellophane is soaked in a solution comprising 1,000 grams of water and 40 grams of potassium or sodium hydrogen phthalate, with the addition of about 125 cc. of glycerin if desired to keep the filter pliable. A single thickness of this filter when used under conditions such as those specified above does not transmit appreciably below 3100 angstrom units.

*Example 3.*—A sheet of No. 600 cellophane is soaked in a solution comprising 1,000 grams of water and 10 grams of phthalic anhydride, with the addition, if desired, of about 125 cc. of glycerin to keep the filter pliable. A filter of this type when used in a single thickness under the conditions specified above does not transmit appreciably below 2970 angstrom units.

The above examples serve to illustrate the process of making filters embodying the invention. It will be understood, however, that any other suitable method for adding the filtering material to the base material may be employed. For example, the desired filtering materials may be mixed with the cellulosic materials during the manufacture of the cellophane or other base material. Furthermore, other base materials than cellophane may be employed, and many other filtering materials than those specified above may be added to the cellophane. The time of soaking is not critical, a period of about one hour being usually sufficient, and the proportions of the solution may also vary somewhat. It will be understood that the thickness of the base may also be varied as desired.

Many other filtering materials may be employed in place of those specified. For example, cobalt chloride, either alone or together with calcium chloride, copper sulphate, lead acetate, etc. have all given good results. Also sodium or potassium cinnamate, sodium or potassium phenolate, or sodium or potassium salicylate can be used. The particular point at which any substance cuts off may readily be determined by experiments.

Filters of this type are very inexpensive and do not deteriorate over long periods of time. They are particularly adapted for keeping or marketing in quantities, since they may be prepared in packages in the form of individual sheets. For example, in home therapeutic treatment with ultra-violet lamps, where it is desired not to transmit rays below about 2900 angstrom units, a package of such filters may be bought and kept and used one at a time as desired, it being merely interposed between the light source and the patient. Or the filter can be prepared in rolls, perforated if desired, and torn off in suitable lengths when needed. These filters are desirable for many other purposes, particularly for home use, such as treatment of foods, milk and the like where the more cumbersome and expensive liquid filter is not suitable. They are also valuable for many commercial uses for these same purposes, for use in botanical processes, etc.

What is claimed is:

1. A dry sheet filter for ultra-violet light comprising a flexible sheet of moisture-proof, insoluble material transparent to ultra-violet light and a filtering substance carried by said sheet and having a cut-off point in the ultra-violet region.

2. A dry sheet filter comprising a sheet of cellulosic material carrying a filtering substance which does not transmit light waves shorter than a critical wave length lying substantially in the region between 2900 and 3100 angstrom units.

3. A dry flexible light filter comprising a flexible transparent sheet and a filtering substance carried thereby which does not transmit wave lengths shorter than a definite critical wave length.

4. A dry flexible filter comprising a flexible transparent sheet constituting a base of substantial mechanical strength and a filtering substance carried thereby and having a cut-off point in the ultra-violet region.

5. A dry sheet-like light filter comprising a flexible sheet of cellulosic material and a filtering substance carried thereby and having a cut-off point in the therapeutic ultra-violet region lying substantially between 2900 and 3100 angstrom units.

6. A dry sheet-like light filter comprising a sheet of regenerated cellulose carrying a filtering substance which does not transmit waves shorter than a critical wave length in the therapeutic ultra-violet region lying substantially between 2900 and 3100 angstrom units.

7. A filter comprising a sheet of regenerated cellulose carrying in adsorbed condition a filtering substance having a cut-off point in the ultra-violet region.

8. A light filter comprising a transparent sheet carrying sodium benzoate.

9. A light filter comprising a transparent sheet carrying potassium hydrogen phthalate.

10. A light filter comprising a transparent sheet carrying phthalic anhydride.

11. A light filter comprising a sheet of regenerated cellulose carrying sodium benzoate.

12. A light filter comprising a sheet of regenerated cellulose carrying potassium hydrogen phthalate.

13. A light filter comprising a sheet of regenerated cellulose carrying phthalic anhydride.

14. A dry sheet filter for ultra-violet light comprising a relatively thin sheet of flexible, insoluble material transparent to ultra-violet light and constituting a base of substantial mechanical strength, and a film of filtering substance adsorbed by said sheet and having a cut-off point in the therapeutic ultra-violet region.

15. A dry sheet filter for ultra-violet light comprising a relatively thin sheet of flexible regenerated cellulose constituting a base of substantial mechanical strength and having adsorbed in the surface thereof a filtering substance substantially opaque to wave lengths in the ultra-violet region lying below 2900 angstrom units.

ROBERT B. WITHROW.